(12) United States Patent
Tamaoka et al.

(10) Patent No.: US 7,721,445 B2
(45) Date of Patent: May 25, 2010

(54) THRUST PLATE, METHOD OF MANUFACTURING THEREOF, MOTOR USING THE THRUST PLATE, AND THE DATA STORAGE DISK DRIVE USING THE MOTOR

(75) Inventors: Takehito Tamaoka, Kyoto (JP); Ryouji Sugiura, Kyoto (JP)

(73) Assignee: Nidec Corporation, Kyoto (JP)

( * ) Notice: Subject to any disclaimer, the term of this patent is extended or adjusted under 35 U.S.C. 154(b) by 589 days.

(21) Appl. No.: 11/730,431

(22) Filed: Apr. 2, 2007

(65) Prior Publication Data

US 2007/0230842 A1  Oct. 4, 2007

(30) Foreign Application Priority Data

Apr. 3, 2006 (JP) .............................. 2006-101412

(51) Int. Cl.
*B21D 28/00* (2006.01)
*B21D 31/02* (2006.01)
*B21K 1/10* (2006.01)
*B23P 17/00* (2006.01)
*F16C 32/06* (2006.01)

(52) U.S. Cl. .................. 29/898.041; 29/898; 29/557; 29/558; 72/331; 72/333; 72/338; 384/121

(58) Field of Classification Search ............... 29/898, 29/898.041, 557, 558, 898.07; 72/324, 326, 72/331, 332, 333, 338; 384/112, 121, 123
See application file for complete search history.

(56) References Cited

U.S. PATENT DOCUMENTS 5,998,898 A * 12/1999 Fukutani et al. ............ 310/90

| | | | |
|---|---|---|---|
| 6,343,877 B1 | 2/2002 | Miura et al. | |
| 6,375,357 B2 | 4/2002 | Miura et al. | |
| 6,554,476 B2 | 4/2003 | Ishikawa et al. | |
| 6,663,287 B2 | 12/2003 | Gomyo et al. | |
| 6,793,394 B2 | 9/2004 | Gomyo et al. | |
| 6,831,812 B2 | 12/2004 | Sode et al. | |
| 2005/0286166 A1 | 12/2005 | Ando et al. | |

FOREIGN PATENT DOCUMENTS

| JP | 2000-145764 A | 5/2000 |
| JP | 2002-070869 A | 3/2002 |
| JP | 2003-278759 A | 10/2003 |
| JP | 2003-314536 A | 11/2003 |
| JP | 2004-211796 A | 7/2004 |

* cited by examiner

*Primary Examiner*—David P Bryant
*Assistant Examiner*—Alexander P Taousakis
(74) *Attorney, Agent, or Firm*—Keating & Bennett, LLP

(57) ABSTRACT

A plate-like material is pressed and a middle concave portion centered on a center axis is formed in one axial surface of the material. Likely, an annular concave portion centered on a center axis and radially outwardly arranged is formed in one and/or the other axial surface of the material. The material is then cut along a radially outer rim of the middle concave portion, and between a radially outer rim and a radially inner rim of the annular concave portion. In this way, a thrust plate having indented portions at radially inside and outside portion of the one and/or the other axial surface thereof is manufactured. A burr formed in press working is accommodate within the indented portion and does not axially protrude from the one and/or the other axial surface of the thrust plate.

9 Claims, 15 Drawing Sheets

THRUST PLATE, METHOD OF MANUFACTURING THEREOF, MOTOR USING THE THRUST PLATE, AND THE DATA STORAGE DISK DRIVE USING THE MOTOR

DESCRIPTION OF THE RELATED ART

1. Field of the Invention

The present invention generally relates to a thrust plate attached to a shaft defining a fluid dynamic bearing mechanism of a motor and a method of manufacturing the thrust plate. The present invention also relates to an electrically powered motor using the thrust plate and a data storage disk drive using the motor.

2. Description of the Related Art

A data storage disk drives (e.g., a hard disk drive) conventionally include a spindle motor for rotationally driving a data storage disk(s) (hereinafter, such spindle motor will be simply referred to as "motor"). One bearing mechanism for the motor, which has been adopted in recent years is a fluid dynamic-pressure employing bearing mechanism (simply referred to as "fluid dynamic bearing" or "FDB" hereinafter). In the motor with the FDB, a rotor unit is non-contact supported by the FDB via lubricating oil, thus the rotor unit spins with high precision and low noise. For some FDBs, a substantially circular thrust plate is arranged at a tip end of a shaft of the motor. A surface(s) of the thrust plate perpendicular to a center axis or of another member facing the thrust plate includes a thrust dynamic pressure generating grooves, thus the thrust plate and another member facing thereto define a thrust fluid dynamic bearing mechanism.

The thrust plate is conventionally manufactured by cutting an annular member away from a plate-shaped material by a press working. When the plate is cut, an undesirable sharp edge (i.e., a burr) may axially protrude at an end portion of the annular member, where the annular member is cut away from the plate-shape material. When such thrust plate is used for the bearing mechanism of the motor, the burr may scratch another member facing the thrust plate and may damage the bearing mechanism when the motor rotates. The burr may be removed by applying a surface-finishing work (e.g., polishing or grinding) to an axially upper surface and an axially lower surface of the thrust plate. However, such process requires additional cost and procedures for manufacturing the thrust plate.

SUMMARY OF THE INVENTION

In order to overcome the problems described above, preferred embodiments of the present invention provide a thrust plate, a method of manufacturing thereof, a motor having the thrust plate, and a data storage disk drive having the motor.

In the method of manufacturing a thrust plate having an annular shape and fixed to a shaft of a fluid dynamic bearing mechanism, according to preferred embodiments of the present invention, a work piece having a plate-like shape with axial surfaces substantially parallel to each other is prepared. A middle concave portion having a circular outer rim centered on a center axis, and an annular concave portion having a radially outer rim and a radially inner rim centered on the center axis and arranged radially outside of the middle concave portion is formed in the work piece. A radially inside of the circular outer rim of the middle concave portion is cut away from the work piece along the circular outer rim by press working, and an inner circumferential surface of the thrust plate is formed. The work piece is cut at a portion radially between the radially outer rim and the radially inner rim of the annular concave portion by press working, and an outer circumferential surface of the thrust plate is formed.

In press working to cut the middle concave portion, force directed from one surface to the other surface in which the middle concave portion is formed is applied to the middle concave portion of the work piece. In the press working to cut the work piece at the portion radially between the radially outer rim and the radially inner rim of the annular concave portion, force directed from one surface in which the annular concave portion is formed to the other surface is applied to a part of the work piece, inner from the portion radially between the radially outer and inner rims.

Through the configuration described above, in which the work piece is cut in the middle concave portion and the annular concave portion, a thrust plate having an indented portion at which a part of the axial surface is axially inwardly indented is manufactured. With the indented portion, an axially protrude portion formed in the press working does not axially protrude from the axial surface of the thrust plate. Thus, it is possible to omit a surface finishing work to remove the axially protruding portion, facilitating the manufacturing of the thrust plate.

A thrust plate according to the preferred embodiments of the present invention, to be fixed to a shaft of a fluid dynamic bearing mechanism, includes annular axial surfaces centered on a center axis, an inner circumferential surface, an outer circumferential surface, an inner indented portion at which a radially inner end portion of one axial surfaces is axially inwardly indented, and an outer indented portion at which a radially outer end portion of the one and/or the other axial surface is axially inwardly indented. The inner indented portion and the outer indented portion are formed by pressing a thrust plate material to provide a concave portion and cutting the thrust plate material at inside the concave portion by press working.

According to the preferred embodiments of the present invention, an electric motor includes a stator unit having an armature, a rotor unit having a rotor magnet facing the armature, and a fluid dynamic bearing mechanism supporting the rotor unit in a rotatable manner about a center axis relative to the stator unit and having the thrust plate with the indented portion arranged thereon.

According to the preferred embodiments of the present invention, a data storage disk drive having the motor is provided.

With the indented portion, an axially protrude portion formed in the press working does not axially protrude from the axial surface of the thrust plate, preventing the axially protruding portion from damaging the fluid dynamic bearing mechanism.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Figure 1:
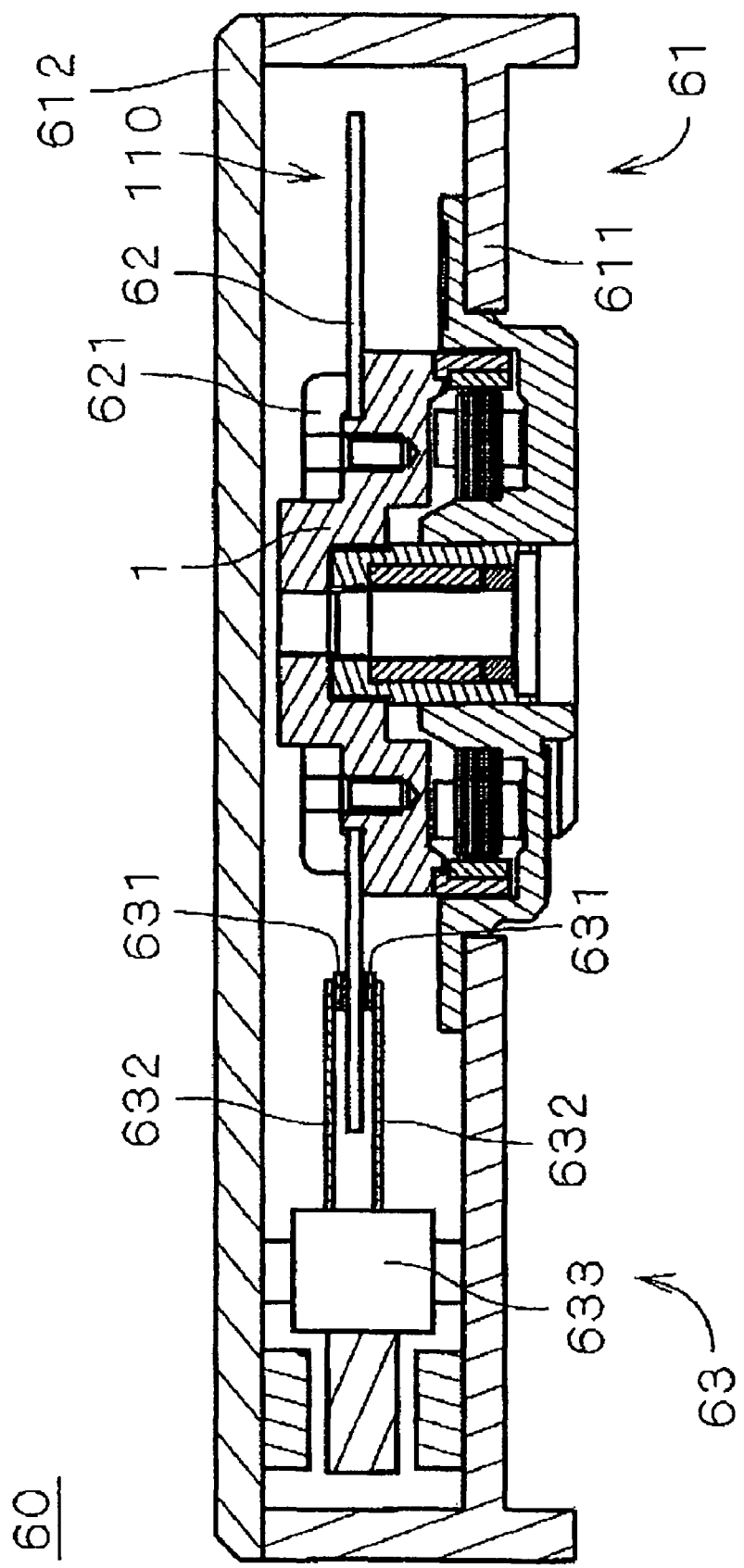
FIG. 1 is a drawing illustrating an internal configuration of a data storage disk drive according to a first preferred embodiment of the present invention.

Reference is made to FIG. 1, a drawing illustrating an internal configuration of a data storage disk drive 60 including an electrically powered spindle motor 1 (hereinafter simply referred to as motor 1) according to a first preferred embodiment of the present invention. The data storage disk drive 60 is a hard disk drive (HDD), and includes: a discoid data storage disk 62 which stores information; an access unit 63 which writes information onto and/or reads information from the data storage disk 62; the motor 1, which retains and spins the data storage disk 62; and a housing 61 defining an interior space 110 accommodating the data storage disk 62, the access unit 63, and the motor 1.

The housing 61 is defined by a first housing member 611 and a second housing member 612. The first housing member 611 has a box shape having an opening in an upper portion thereof, and the motor 1 and the access unit 63 are attached on a base of the first housing member 611. The second housing member 612 having a plate-like shape is arranged on the first housing member 611 and closes the upper opening of the first housing member 611. With the first housing member 611 and the second housing member 612 joined together, the interior space 110 is defined in the housing 61, wherein the interior space 110 is a clean chamber where dust and debris are extremely slight.

The data storage disk 62 is set onto an upper surface of the motor 1 and secured on the motor 1 by a clamp 621. The access unit 63 includes a head 631 that adjoins the data storage disk 62 for magnetically writing information onto and reading information from the data storage disk 62, an arm 632 which supports the head 631, and a head-shifting mechanism 633 which by shifting the arms 632 varies the position of the head 631 relative to the data storage disk 62. Through the configuration of these components, the head 631 accesses required positions on the spinning data storage disk 62 when the head 631 has been brought adjacent to the data storage disk 62 to conduct the reading and/or writing information onto the data storage disk 62.

Figure 2:
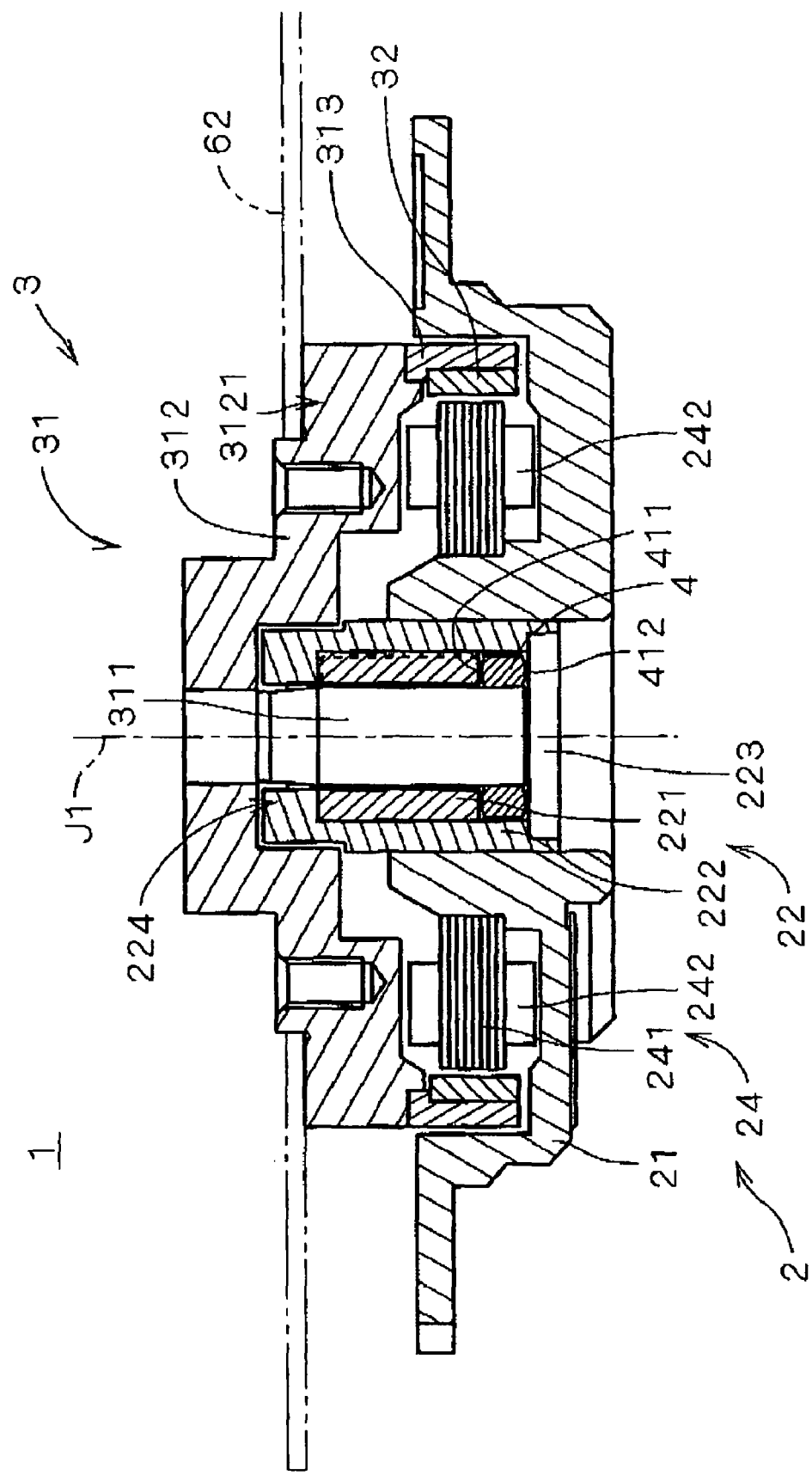
FIG. 2 is a cross sectional view illustrating the motor.

FIG. 2 is a vertical sectional view illustrating a configuration of the motor 1 used in the data storage disk drive 60 for rotating the data storage disk 62. In FIG. 2, the data storage disk 62 set onto the motor 1 is illustrated with a two-dot chain line. As illustrated in FIG. 2, the motor 1 is an inner rotor type motor and includes a stator unit 2 as a stationary assembly, and a rotor unit 3 as a rotatable assembly. The rotor unit 3 is supported via a bearing mechanism employing hydrodynamic pressure by the agency of lubricating oil (i.e., a fluid dynamic bearing mechanism (FDB)) such that the rotor unit 3 is rotatable relative to the stator unit 2 around a center axis J1 of the motor 1. For convenience in the following explanation, the rotor-unit-3 side of the motor 1 will be described as an upper side and the stator-unit-2 side as a lower side, but the center axis J1 need not necessarily coincide with the direction of gravity.

The stator unit 2 includes a base portion 21 which retains different parts defining the stator unit 2; a substantially hollow cylindrical sleeve unit 22 which constitutes the bearing mechanism rotatably supporting the rotor unit 3; and an armature 24 supported by the base portion 21 at radially outside of the sleeve unit 22. A lower portion of the sleeve unit 22 is fitted into an opening of the base portion 21.

The sleeve unit 22 includes: a sleeve 221 having a substantially hollow cylindrical shape centered on the center axis J1, into which a shaft 311 attached to the rotor unit 3 is inserted; a substantially hollow cylindrical sleeve housing 222 accommodating the sleeve 221 therein; and a sealing cap 223 closing a lower end of the sleeve housing 222. An axially upper portion of the sleeve housing 222 includes an annular convex portion 224 radially inwardly extending toward the center axis J1. An inner circumferential surface of the annular convex portion 224 faces an outer circumferential surface of the shaft 311, and a lower surface of the annular convex portion 224 abuts an upper surface of the sleeve 221. The sleeve 221 is preferably made of a porous material, and the sleeve housing 222 with the sealing cap 223 holds the lubricating oil with which the sleeve 221 is impregnated. The armature 24 includes a core 241 formed by laminating a plurality of silicon steel plates and a plurality of coils 242 defined by wires wound around a plurality of teeth provided on the core 241.

The rotor unit 3 includes: a rotor hub 31 which supports the various parts defining the rotor unit 3; the shaft 311 which has a substantially cylindrical shape centered on the center axis J1 and extends axially downwardly from the rotor hub 31; and a magnet 32 arranged to the rotor hub 31 and encircling the center axis J1. The magnet 32 is an annular multipolar magnet and generates rotation force (torque) centered on the center axis J1 between itself and the armature 24. In other words, the rotor unit 3 rotates relative to the stator unit 2 with the center axis J1 as center by an interaction between the armature 24 and the magnet 32.

The rotor hub 31 includes: a hub body 312 having a discoid shape, perpendicularly with respect to the center axis J1 flaring from an upper end portion of the shaft 311; and a substantially hollow cylindrical yoke 313 extending downwardly along a rim of the hub body 312.

The hub body 312 is made of an aluminum material, an aluminum array material or the like and includes a disk placing portion 3121 on which the data storage disk 62 is to be placed. The yoke 313 is made of a ferromagnetic material (e.g., a stainless steel material) and arranged below the disk placing portion 3121. The shaft 311 is made of the stainless steel material or the like, and the upper end portion thereof is fitted in an opening arranged at a middle of the hub body 312. A substantially discoid thrust plate 4 centered on the center axis J1 is arranged at an axially lower end portion of the shaft 311. When the force removing the rotor unit 3 from the stator unit 2, the thrust plate 4 engages with a lower end surface of the sleeve 221, thus, it prevents the shaft 311 from coming off the sleeve 221.

In the motor 1, micro-gaps are provided: in between the inner circumferential surface of the annular convex portion 224, and the outer circumferential surface of the shaft 311; in between the lower end surface of the sleeve 221, and an upper annular surface 411 of the thrust plate 314 (i.e., an upper end surface of the thrust plate 4); and in between a lower annular surface 412 of the thrust plate 314 (i.e., a lower end surface of the thrust plate 4), and an upper surface of the sealing cap 223. Those micro-gaps are continuous, and the bearing mechanism is defined with the lubricating oil being retained without interruption in the continuous micro-gaps. At a portion of the shaft 311 radially facing the annular convex portion 224, a diameter of the shaft 311 is gradually constricted along the axially upper direction such that the micro-gap therebetween gradually expand in the radial direction along the axially upper direction. Through the configuration described above, so called "taper-seal section" is defined between the annular convex portion 224 and the shaft 311, whereby the gap functions as an oil buffer, preventing outflow of the lubricating oil.

In the lower end surface of the sleeve housing 222 facing the upper annular surface 411 of the thrust plate 4, as well as in the upper surface of the sealing cap 223 facing the lower annular surface 412 of the thrust plate 4, grooves (e.g., grooves in spiral forms) for developing in the lubricating oil pressure directed toward the center axis J1 when the rotor unit 3 spins are formed, wherein the thrust fluid dynamic bearing mechanism is defined between the surfaces facing each other. Meanwhile, grooves (e.g., grooves in herringbone forms) for developing hydrodynamic pressure in the lubricating oil are formed in the surface(s) of the shaft 311 and/or the sleeve 221 facing each other, wherein a radial fluid dynamic bearing mechanism is defined between the surfaces facing each other.

In the motor 1, since the rotor unit 3 is non-contact supported, via the lubricating oil, by the fluid dynamic bearing mechanism, the data storage disk 62 attached to the rotor unit 3 may be spun with high precision and low noise.

Figure 3:
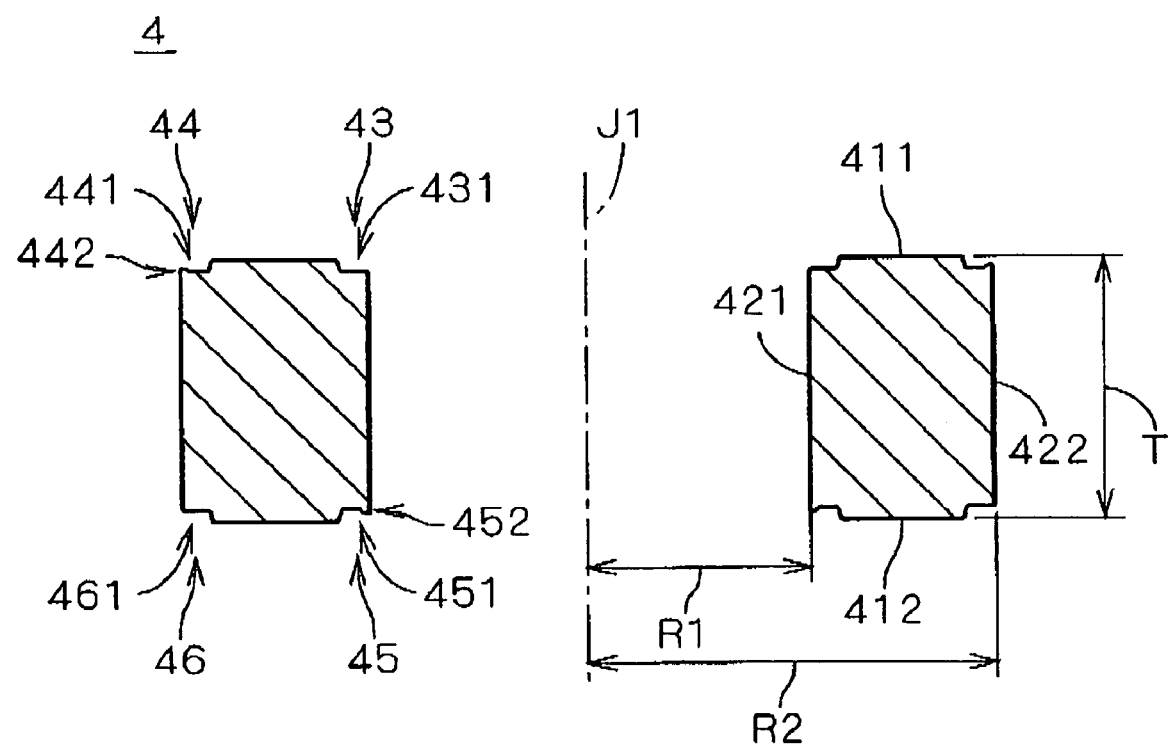
FIG. 3 is a sectional view illustrating a thrust plate according to the first preferred embodiment of the present invention.
Figure 4:
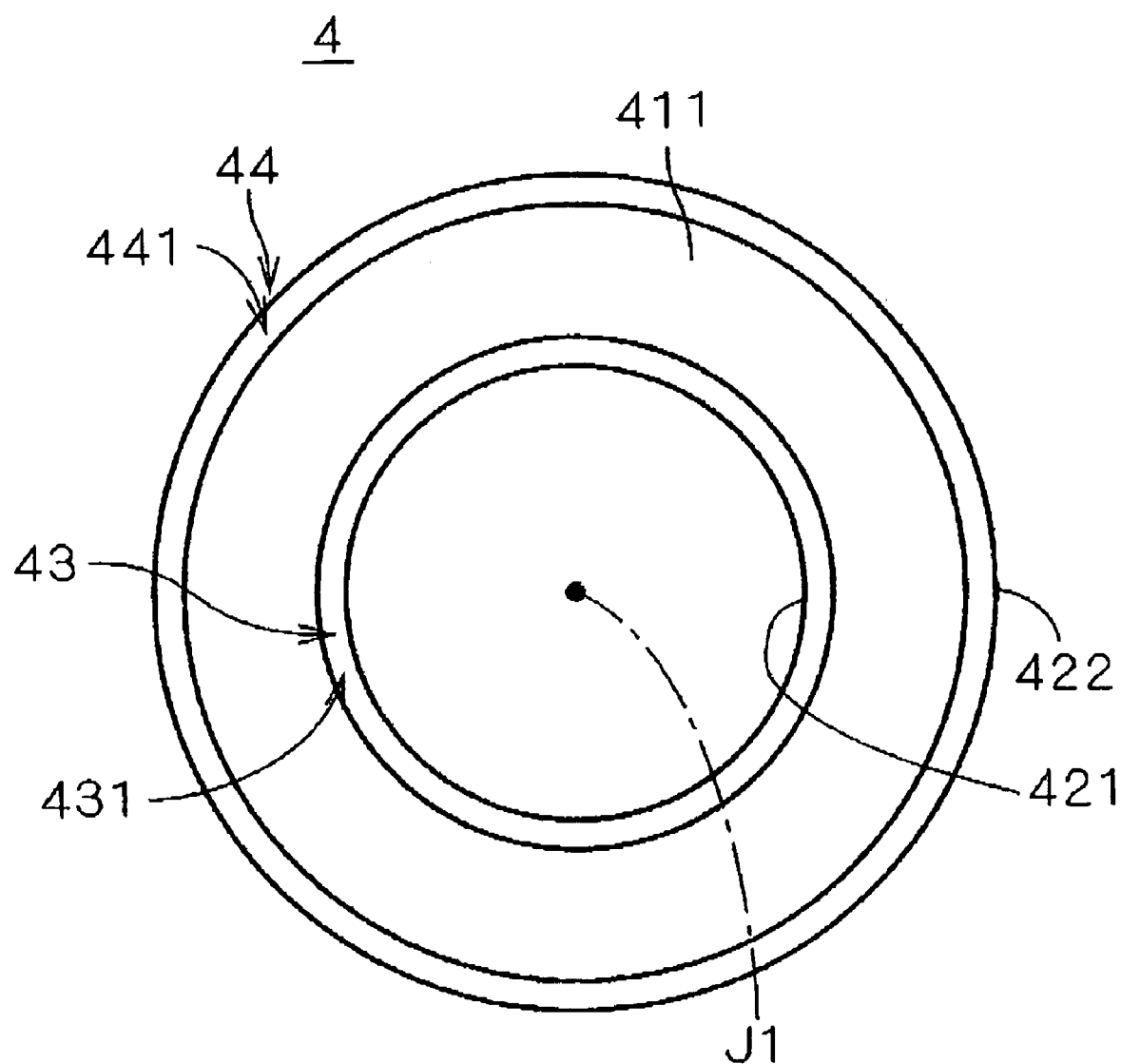
FIG. 4 is a plan view illustrating the thrust plate.

Next, a configuration of the thrust plate 4 according to the first preferred embodiment of the present invention will be described in detail. FIG. 3 is a sectional view illustrating the thrust plate 4, and FIG. 4 is a plan view illustrating the thrust plate 4. As described above, the thrust plate 4 includes the upper annular surface 411 and the lower annular surface 412 parallel to each other and centered on the center axis J1. The thrust plate 4 further includes an inner circumferential surface 421 centered on the center axis J1 and axially extending between radially inner end portions of the upper annular surface 411 and the lower annular surface 412. The thrust plate 4 also includes an outer circumferential surface 422 centered on the center axis J1 and axially extending between radially outer end portions of the upper annular surface 411 and the lower annular surface 412. In FIG. 3, a radius of the inner circumferential surface 421 is illustrated as R1, and a radius of the outer circumferential surface 422 as R2.

The upper annular surface 411 of the thrust plate 4 includes an upper inner edge portion 43 having an upper inner indented portion 431 where a radially inner end is axially inwardly indented, and an upper outer edge portion 44 having an upper outer indented portion 441 where a radially outer end is axially inwardly indented. In the same manner, the lower annular surface 412 of the thrust plate 4 includes an lower inner edge portion 45 having an lower inner indented portion 451 where a radially inner end is axially inwardly indented, and an lower outer edge portion 46 having an lower outer indented portion 461 where a radially outer end is axially inwardly indented.

Figure 5:
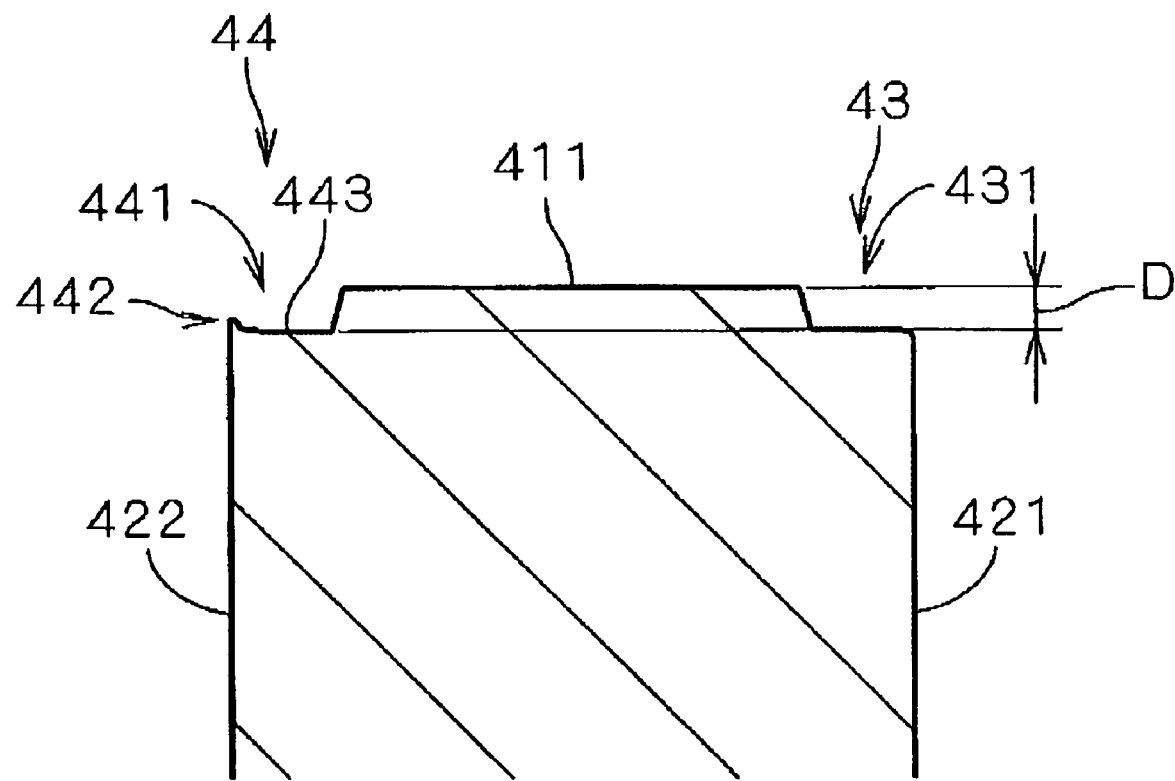
FIG. 5 is a magnified view illustrating the thrust plate.

FIG. 5 is a magnified view illustrating an upper left part of the thrust plate 4 illustrated in FIG. 3. As illustrated in FIG. 5, the upper surface 411 of the thrust plate 4 is axially inwardly indented at the upper inner edge portion 43 and the upper outer edge portion 44 such that the upper inner indented portion 431 and the upper outer indented portion 441 have substantially same axial height D. If the thrust plate 4 has about 2.2 mm axial thickness, the axial height D of the upper inner indented portion 431 and the upper outer indented portion 441 is configured about 0.09 mm. The upper outer indented portion 441 includes an upper outer protrude portion 442 which axially upwardly extends from a base surface of the upper outer indented portion 441. An axially upper tip end of the upper outer protrude portion 442 is arranged at an axially lower position than the upper annular surface 411, thus the upper outer protrude portion 442 does not axially protrude from the upper annular surface 411.

In the same manner, the lower inner indented portion 451, where the lower annular surface 412 is axially inwardly indented at the radially inner end portion thereof, is includes a lower inner protrude portion 452 which axially downwardly extends from a base surface of the lower inner indented portion 451. An axially lower tip end of the lower inner protrude portion 452 is arranged at an axially upper position than the lower annular surface 412, thus the lower inner protrude portion 452 does not axially protrude from the lower annular surface 412.

Figure 6:
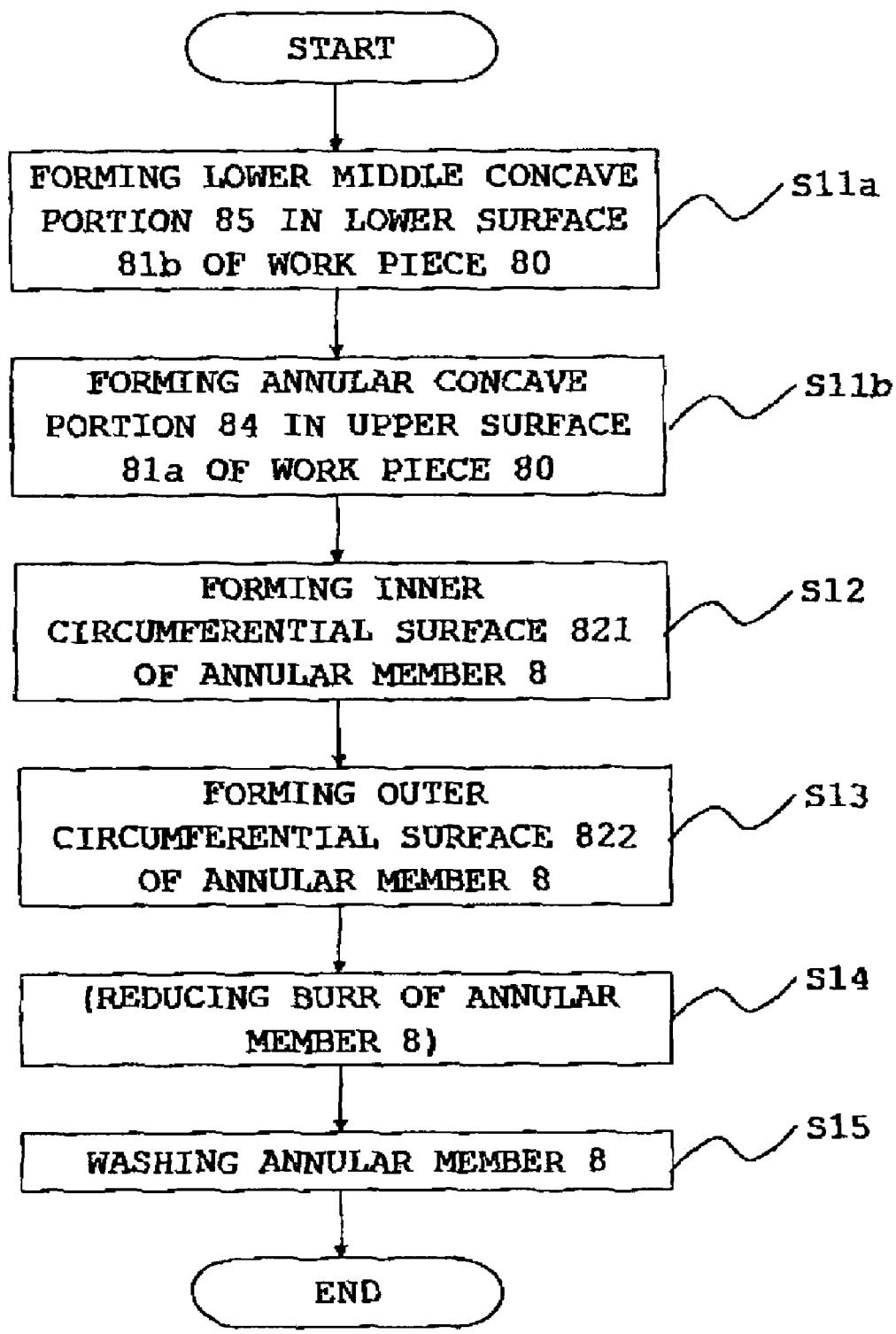
FIG. 6 is a chart setting forth process flow in manufacturing of the thrust plate.

Next, a method of manufacturing the thrust plate 4 will be described. FIG. 6 is a chart setting forth process flow in manufacturing of the thrust plate 4. In the method of manufacturing the thrust plate 4, a lower surface of a work piece 80 having a plate shape (e.g., a stainless steel plate having 2.2 mm thickness) is pressed with a predetermined die (a step S11$a$). In the step S11$a$, a lower middle concave portion 85 and a lower annular concave portion 86 are formed in a lower surface 81$b$ of the work piece 80. The lower middle concave portion 85 includes a radially outer rim having a circular shape centered on the center axis J1, and a radius thereof is slightly larger than the radius R1 of the thrust plate 4. The lower annular concave portion 86 has a ring shape defined by a radially inner rim and a radially outer rim, centered on the center axis J1, having an outer radius slightly greater than the radius R2 and an inner radius slightly smaller than the radius R2 of the thrust plate 4. In FIG. 6, the step S11$a$ is described as a step of forming the lower middle concave portion 85. It should be noted, however, other portions (e.g., the lower annular concave portion 86) may be formed concurrently with the lower middle concave portion 85 by the press working or the like (as well as a later described step S11$b$ and other steps in FIG. 6).

In the step S11$b$, an upper surface 81$a$ of the work piece 80 is pressed with a predetermined die, and an upper middle concave portion 83 and an upper annular concave portion 84 are formed in the upper surface 81$a$ of the work piece 80. The upper middle concave portion 83 includes an outer rim having a circular shape centered on the center axis J1 and a radius slightly larger than the radius R1 of the thrust plate 4. The upper annular concave portion 84 has a ring shape defined by a radially inner rim and a radially outer rim, centered on the center axis J1, having an outer radius slightly greater than the radius R2 and an inner radius slightly smaller than the radius R2 of the thrust plate 4. In FIG. 6, steps S11$a$ and S11$b$ are illustrated as separated steps from each other, but steps S11$a$ and S11$b$ may be concurrently performed in a single step.

Through steps S11$a$ and S11$b$ described above, an upper annular surface 811 centered on the center axis J1 is provided to the upper surface 81$a$ of the work piece 80 at between the upper middle concave portion 83 and the upper annular concave portion 84, and a lower annular surface 812 centered on the center axis J1 is provided to the lower surface 81$b$ at between the lower middle concave portion 85 and the lower annular concave portion 86.

After steps S11a and S11b, the work piece 80 is arranged on a first supporting member 91 (illustrated by double dot chine line in FIG. 8), wherein the lower annular surface 812 of the work piece 80 is abutted against an annular supporting surface of the first supporting member 91. Then, a middle portion of the work piece 80 is punched, by applying force axially downwardly directed to a radially inside of the middle portion of the work piece from an axially upper side thereof, with a first die 92 having a circular shape centered on the center axis J1 and a radius substantially the same as the R1 (a step S12). Through the step S12, an inner side surface 821 centered on the center axis J1 (corresponding to an inner circumferential surface of an annular member) is provided.

Figure 8:
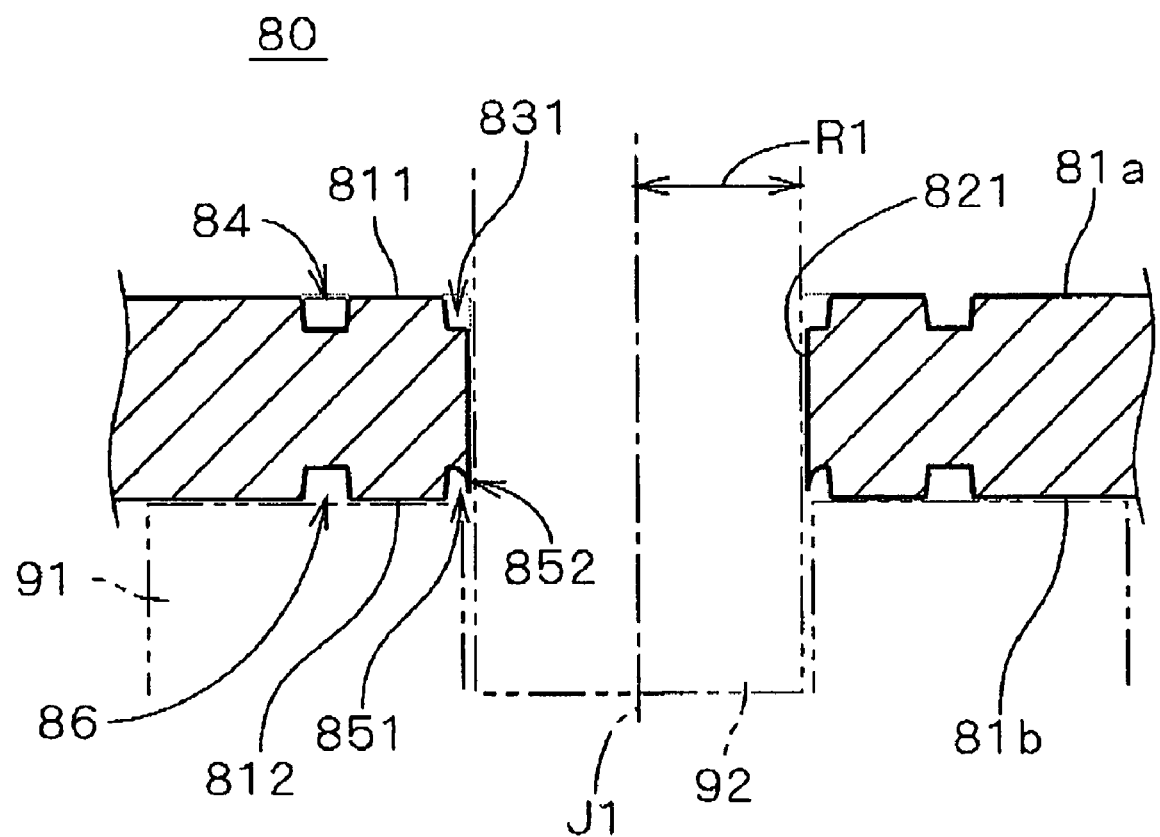
FIG. 8 is a view illustrating another process of manufacturing of the thrust plate.

In the step S12, in which a middle portion of the work piece 80 is cut away from the work piece 80, an upper inner circular indented portion 831 and a lower inner circular indented portion 851 are formed. When the work piece 80 is cut, an undesirable sharp edge 852 (i.e., a lower inner burr 852) is formed at a radially inner end portion of the lower inner circular indented portion 851 as illustrated in FIG. 8. In the present preferred embodiment of the present invention, since the lower inner circular potion 851 is provided, an axially lower tip end of the lower inner burr 852 does not axially protrude from the lower annular surface 812. In FIG. 8 (as well as in FIGS. 9, 10, 11B, and 11C), the lower inner burr 852 is illustrated with a great emphasis on its axial size for an illustrative purpose.

After the step S12, the work piece 80 is arranged on a second supporting member 93 (illustrated by a double dot chine line in FIG. 9), wherein a part of the lower surface 81b radially outside from the lower annular surface 812 is abutted against an annular supporting surface of the second supporting member 93. Then the work piece 80 is punched, by applying force axially downwardly directed to a radially inside of the annular concave portions 84 and 86 from the axially upper side thereof, with a second die 94 having a circular shape centered on the center axis J1 and a radius substantially the same as the R2 (a step S13). In the present preferred embodiment of the present invention, the upper and lower annular concave portions 84 and 86 have greater outer radius but smaller inner radius than the R2, thus, the work piece 80 is cut along a substantially radially middle portion of the upper and lower annular concave portions 84 and 86. Through the step S13, an annular member 8 centered on the center axis J1 and having an outer side surface 822 (corresponding to an outer circumferential surface of the annular member) is cut away from the work piece 80. The inner side surface 821 and the outer side surface 822 define the inner circumferential surface and the outer circumferential surface of the annular member 8.

Figure 9:
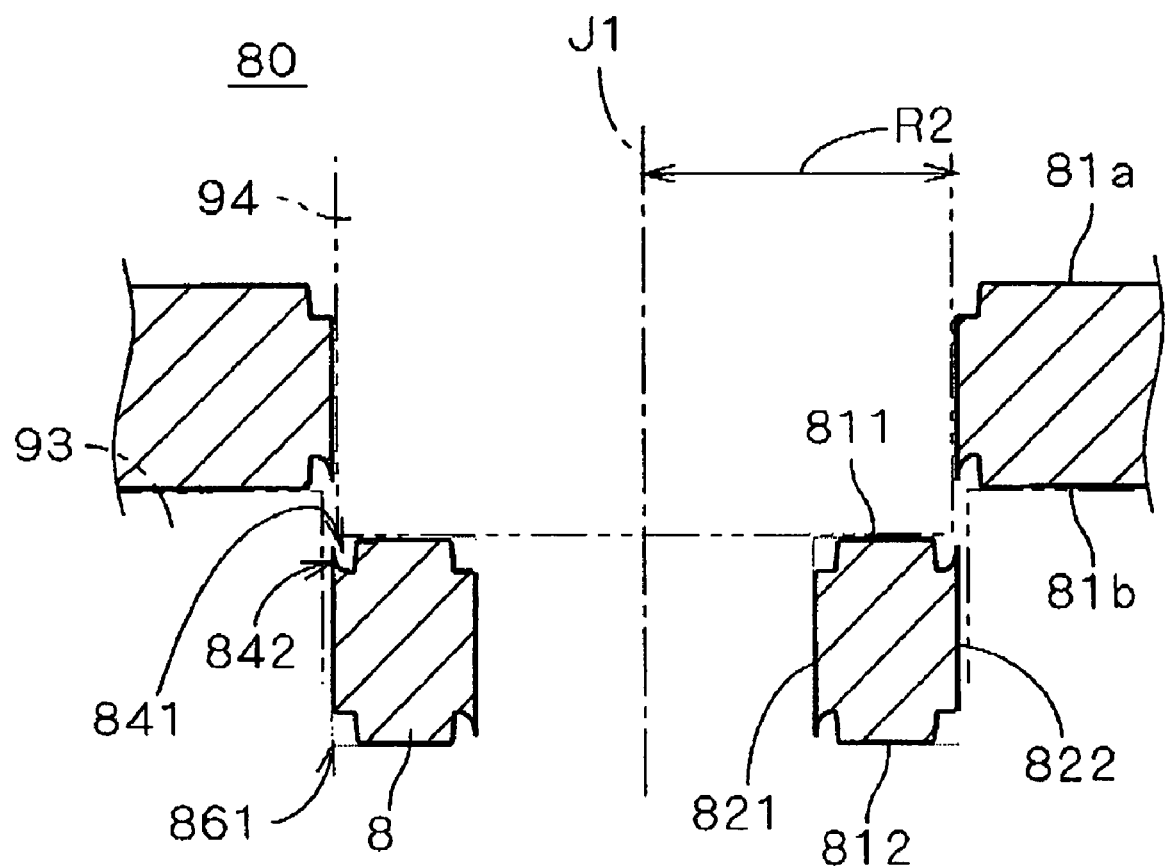
FIG. 9 is a view illustrating yet another process of manufacturing of the thrust plate.

Further more, in the step S13, by cutting the annular member 8 away from the work piece 80 along the substantially radially middle of the upper annular concave portion 84 and the lower annular concave portion 86, an upper outer circular indented portion 841 and a lower outer circular indented portion 861 as illustrated in FIG. 9 are formed. When the annular member 8 is cut away from the work piece 80, an upper outer burr 842 axially upwardly protruding is formed at a radially outer end portion of the upper outer indented portion 841. In the present preferred embodiment of the present invention, since the upper outer indented portion 841 is provided, an axially upper tip end of the upper outer burr 842 does not axially protrude from the upper annular surface 811 of the annular member 8.

After the annular member 8 is obtained, a deburring work (e.g., tumble finishing or shot blasting) may be performed on the annular member 8 (the tumbling finishing is a surface-finishing operation in which irregularities are removed or surfaces are polished by tumbling the annular member 8 together in a barrel with polishing compounds, and the shot blasting is a finishing operation by means of a stream of abrasive powder drown through a nozzle, for example). By such the deburring work, edges of the annular member 8 are slightly removed, and sizes of the upper outer burr 842 and the lower inner burr 852 are reduced (a step S14).

Then, the annular member 8 is washed. For example, the annular member 8 is placed in an ultrasonic cleaning bath pooling pure water, and ultrasonic is applied thereto to wash the annular member 8. Then, the manufacturing process of the thrust plate 4 is finished by obtaining the annular member 8 as the thrust plate 4 which is to be installed in the motor 1. The washing process may be performed prior to the deburring work on the annular member 8.

Figure 10:
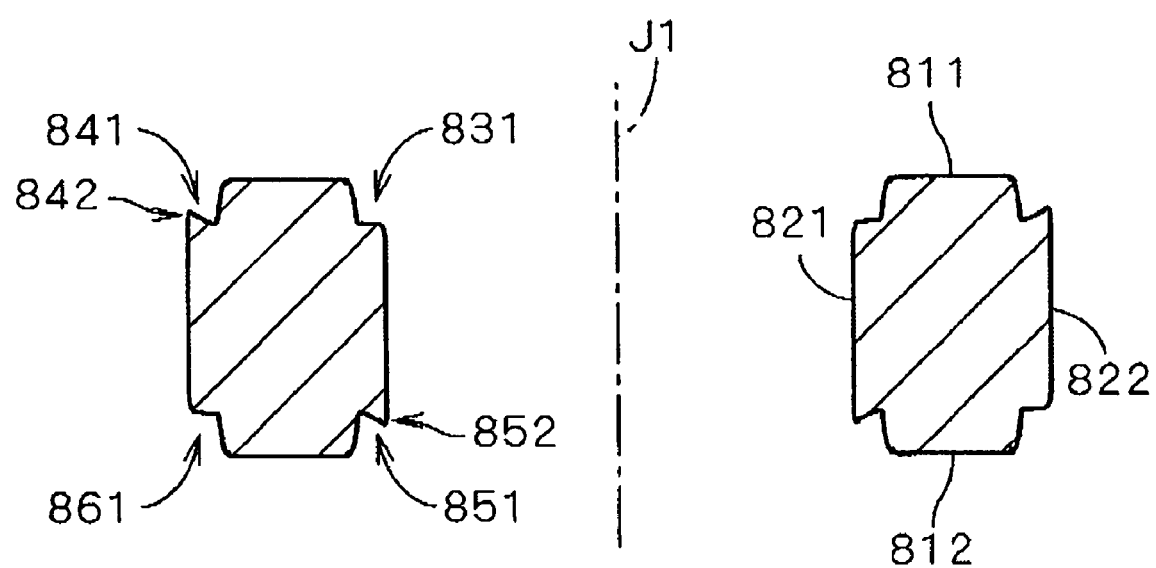
FIG. 10 is a drawing illustrating an annular member whose undesirable sharp edges have been processed.

As illustrated in FIG. 10, the upper annular surface 811 and the lower annular surface 812 of the annular member 8 correspond to the upper annular surface 411 and the lower annular surface 412 of the thrust plate 4, and the inner side surface 821 and the outer side surface 822 of the annular member 8 correspond to the inner circumferential surface 421 and the outer circumferential surface 422. The indented portions 831, 841, 851, and 861 correspond to the upper inner indented portion 431, the upper outer indented portion 441, the lower inner indented portion 451, and the lower outer indented portion 461 of edge portions of the thrust plate 4, respectively. The upper outer burr 842 and the lower inner burr 852 of the annular member 8 correspond to the upper outer protrude portion 442 and the lower inner protrude portion 452 of the thrust plate 4. In the present preferred embodiment of the present invention, burrs are not formed at portions of the annular member 8 corresponding to the upper inner edge portion 43 and the lower outer edge portion 46 of the thrust plate 4, thus, it is not necessary to provide the upper inner circular indented portion 831 and the lower outer indented portion 861 on the annular member 8. However, it is preferable to provide the edge portions 43 and 46, since they allow the thrust plate 4 to be installed in the motor 1 in an axially upside down manner, enabling the manufacturing process to be facilitated.

Conventionally, when the thrust plate is manufactured by the press working, the burrs formed by the pressing work are removed by grinding axially both side surfaces of a work in process piece. In such grinding process, axially both side surfaces should be glided with ensuring adequate parallelism thereof. Such process requires a high degree of accuracy, resulting in increasing the manufacturing cost of the thrust plate. If the thrust plate is installed in the fluid dynamic bearing mechanism without removing the burrs, the burrs may scratch another member facing the thrust plate when the motor rotates, resulting in damaging the fluid dynamic bearing mechanism.

In the manufacturing method of the thrust plate 4, illustrated in FIG. 6, according to the present preferred embodiment of the present invention, the lower middle concave portion 85 is provided in the lower surface 81b of the work piece 80, and the upper annular concave portion 84 is provided in the upper surface 81a of the work piece 80. Then, the middle portion of the work piece 80 is cut away from the work piece 80 along an outer rim of the lower middle concave portion 85, and the work piece 80 is cut at the middle of the upper annular concave portion 84 by the press working with dies, thus the annular member 8 having indented portions is obtained. The lower inner burr 852 and the upper outer burr 842 formed in the press working process are accommodated within the lower inner indented portion 851 defined by a part of the lower middle concave portion 85 and the upper outer indented portion 841 defined by a part of the upper annular concave portion 84. Therefore, it is possible to prevent the burrs from damaging the fluid dynamic bearing mechanism when the motor 1 rotates. Furthermore, manufacturing of the thrust plate 4 is facilitated by omitting the finishing work of the upper annular surface 411 and the lower annular surface 412, and the cost for manufacturing is lowered.

In the first preferred embodiment of the present invention, the deburring work may be performed on the thrust plate 4 to reduce the axial height of the upper outer burr 842 and the lower inner burr 852. By performing the deburring process, it is possible to ensure the burrs 842 and 852 are axially housed within the indented portions 841 and 851, preventing the burrs 842 and 852 from adversely affecting the fluid dynamic bearing mechanism. Comparing with the grinding process in the conventional art, in which the thrust plate is grinded with ensuring the high degree of accuracy, the deburring work in the present preferred embodiment of the present invention is far easy to perform.

Figure 11A:
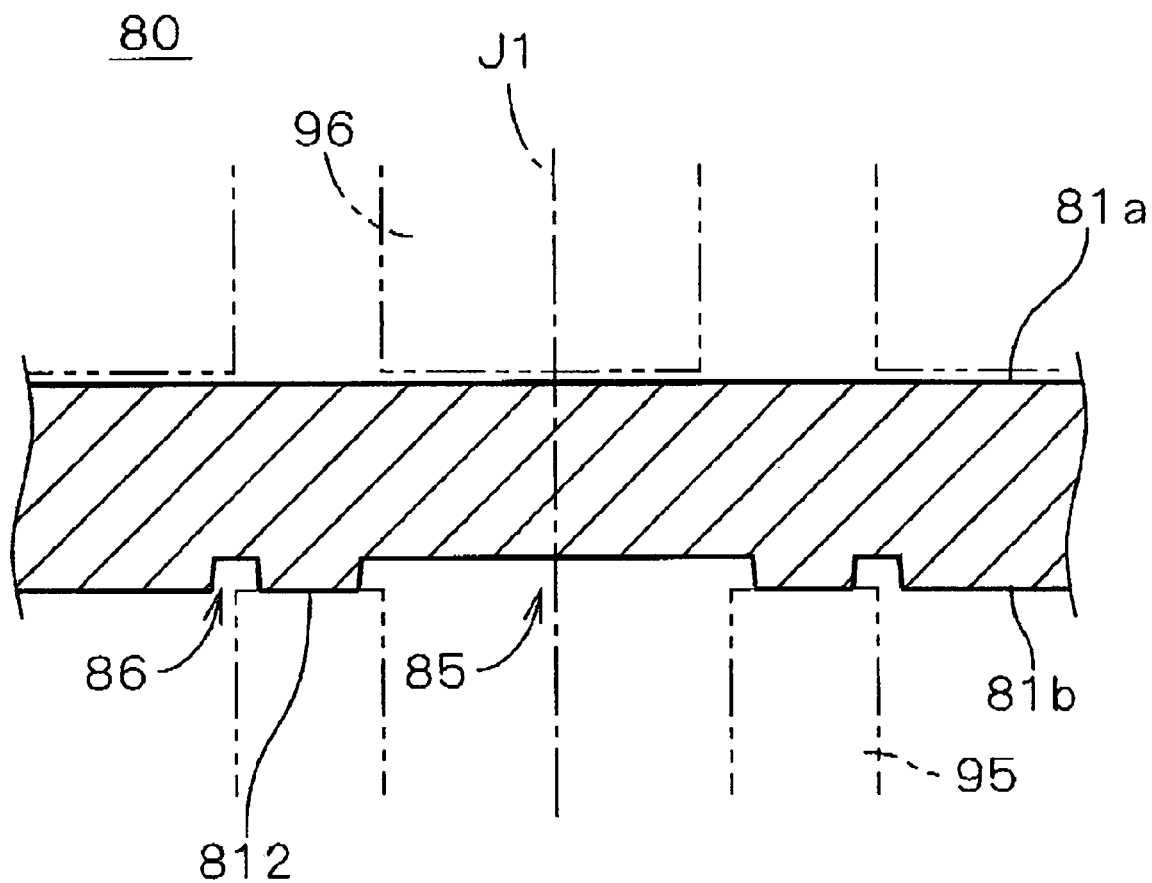
FIG. 11A is a drawing illustrating one process of manufacturing of the thrust plate according to a modified example of the first preferred embodiment of the present invention.
Figure 11B:
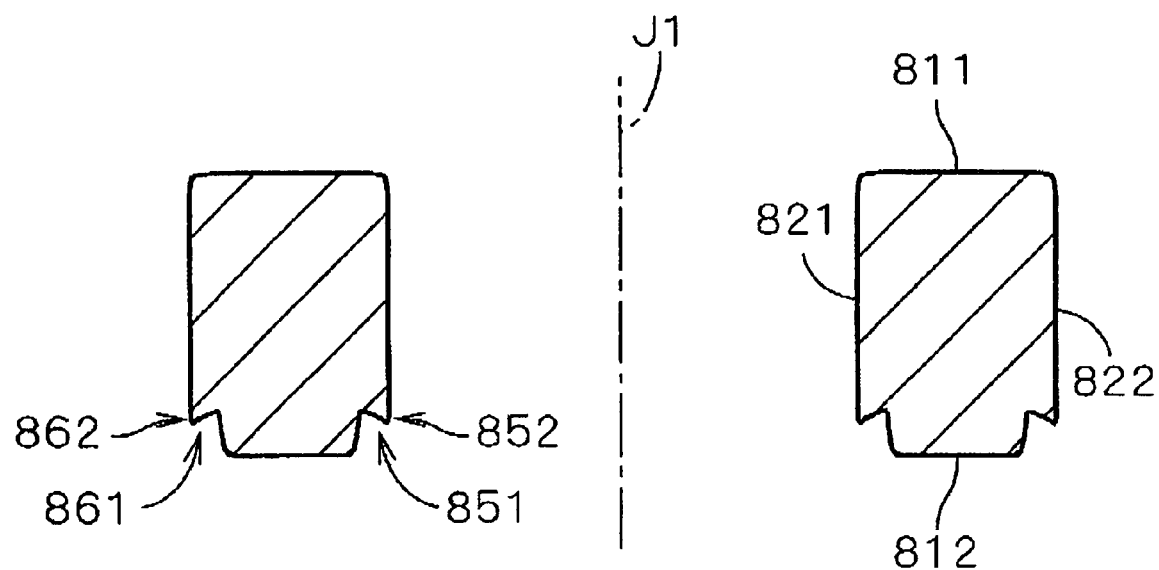
FIG. 11B is a drawing illustrating the annular member.

FIGS. 11A and 11B are drawings for describing processes of manufacturing of the thrust plate 4 according to a modified example of the first preferred embodiment of the present invention. In the manufacturing method of the thrust plate 4 according to the present preferred embodiment of the present invention, the lower middle concave portion 85 and the lower annular concave portion 86 are formed in the lower surface 81b of the work piece 80. Unlike the first preferred embodiment of the present invention described above, the upper middle concave portion 83 and the upper annular concave portion 84 are not formed in the upper surface 81a of the work piece 80.

Then, the work piece 80 is arranged on a third supporting member 95, wherein the lower annular surface 812 is abutted against an annular supporting surface of the third supporting member 95 (see FIG. 11A), and the middle portion of the work piece 80 is cut away from the work piece 80 in the axially upper side to the lower side direction, along near a radially outer rim of the lower middle concave portion 85, and along the substantially radially middle of the lower annular concave portion 86. By the process described above, the outer side surface 822 centered on the center axis J1 (corresponding to the outer circumferential surface of the annular member) is formed (i.e., the annular member 8 centered on the center axis J1 is cut away from the work piece 80).

As illustrated in FIG. 11B, the lower inner burr 852 and a lower outer burr 862 axially downwardly extend, but they do not axially protrude from the lower annular surface 812 (i.e., the lower inner burr 852 is accommodated within the lower inner indented portion 851 defined by a part of the lower middle concave portion 85, and the lower outer burr 862 is accommodated within the lower outer indented portion 861 defined by a part of the lower annular concave portion 86). The deburring work and washing process may be performed on the annular member 8 before manufacturing of the thrust plate 4 is completed.

In the present preferred embodiment of the present invention, the lower middle concave portion 85 and the lower annular concave portion 86, defining the lower inner indented portion 451 and the lower outer indented portion 461 of the thrust plate 4 respectively, are formed in the lower surface 81b of the work piece 80 by pressing work at once. Then the work piece 80 is cut at radially inside and outside portions of the lower annular surface 812 by the press working at once, facilitating manufacturing of the thrust plate 4.

Figure 11C:
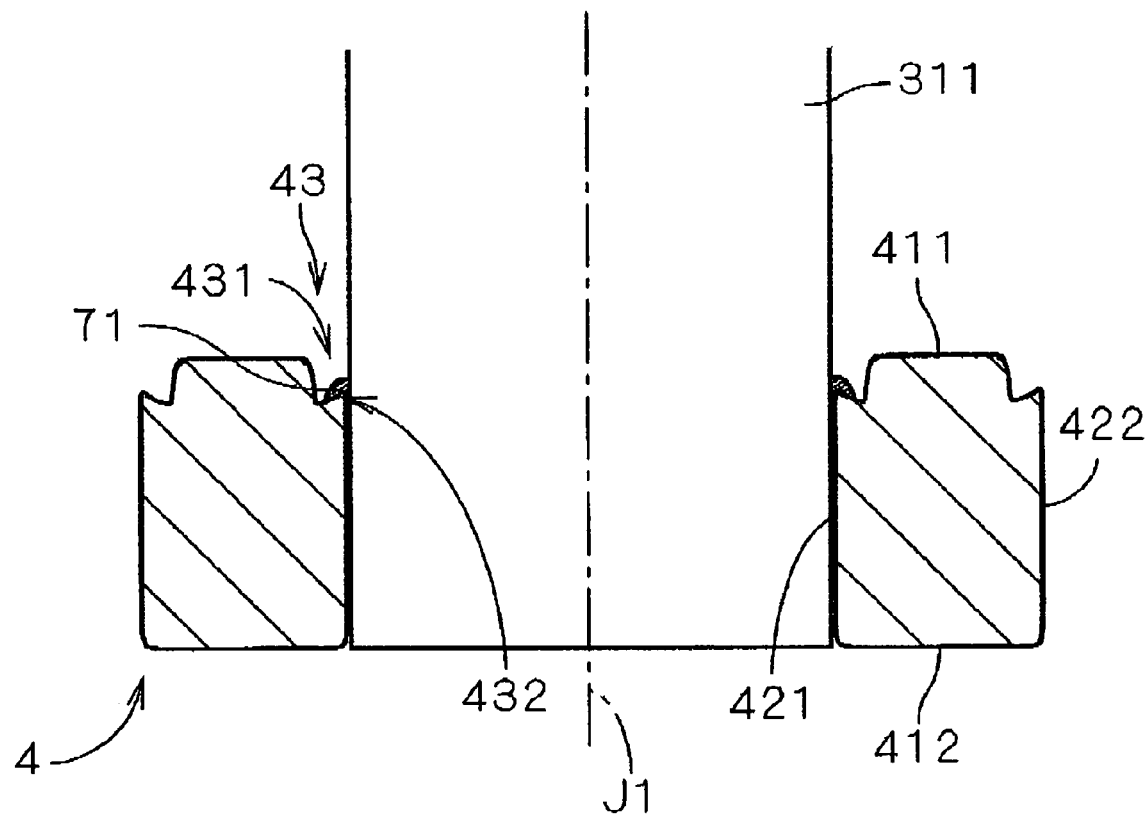
FIG. 11C is a drawing illustrating the thrust plate and a shaft.

The lower inner indented portion 451 and/or the upper inner indented portion 431 may be used for fixing the thrust plate 4 to the shaft 311. For example, when the thrust plate 4, having an upper inner protrude portion 432 within the upper inner edge portion 43, is fixed to the shaft 311, the adhesive is applied to the outer circumferential surface of the lower end portion of the shaft 311 and/or to the inner circumferential surface 421 of the thrust plate 4. Then, the shaft 311 is inserted to the thrust plate 4 from the upper side of the thrust plate 4. The shaft 311 has a dimension slightly smaller than the inner radius R1 of the thrust plate 4, and a portion of the adhesive 71 applied to the shaft 311 is removed at and remains within the upper inner edge portion 43 as illustrated in FIG. 11C. Then, the adhesive is hardened, and the shaft 311 and the thrust plate 4 are fixed together.

The removed adhesive is remains within the upper inner edge portion 43 and does not axially upwardly protrude from the upper annular surface 411, preventing the removed adhesive from adversely affecting the bearing mechanism while firmly fixing the shaft 311 and the thrust plate 4 together with the adhesive.

After the shaft 311 is inserted into the thrust plate 4, the adhesive may be applied to the upper inner edge portion 43 and/or the lower inner edge portion 44 such that the hardened adhesive does not axially protrude from the upper annular surface 411 while preventing the burrs from coming off. The shaft 311 may be inserted into the thrust plate 4 from the axially lower side of the thrust plate 4, and the removed adhesive may be remains within the lower inner edge portion 44.

Figure 12:
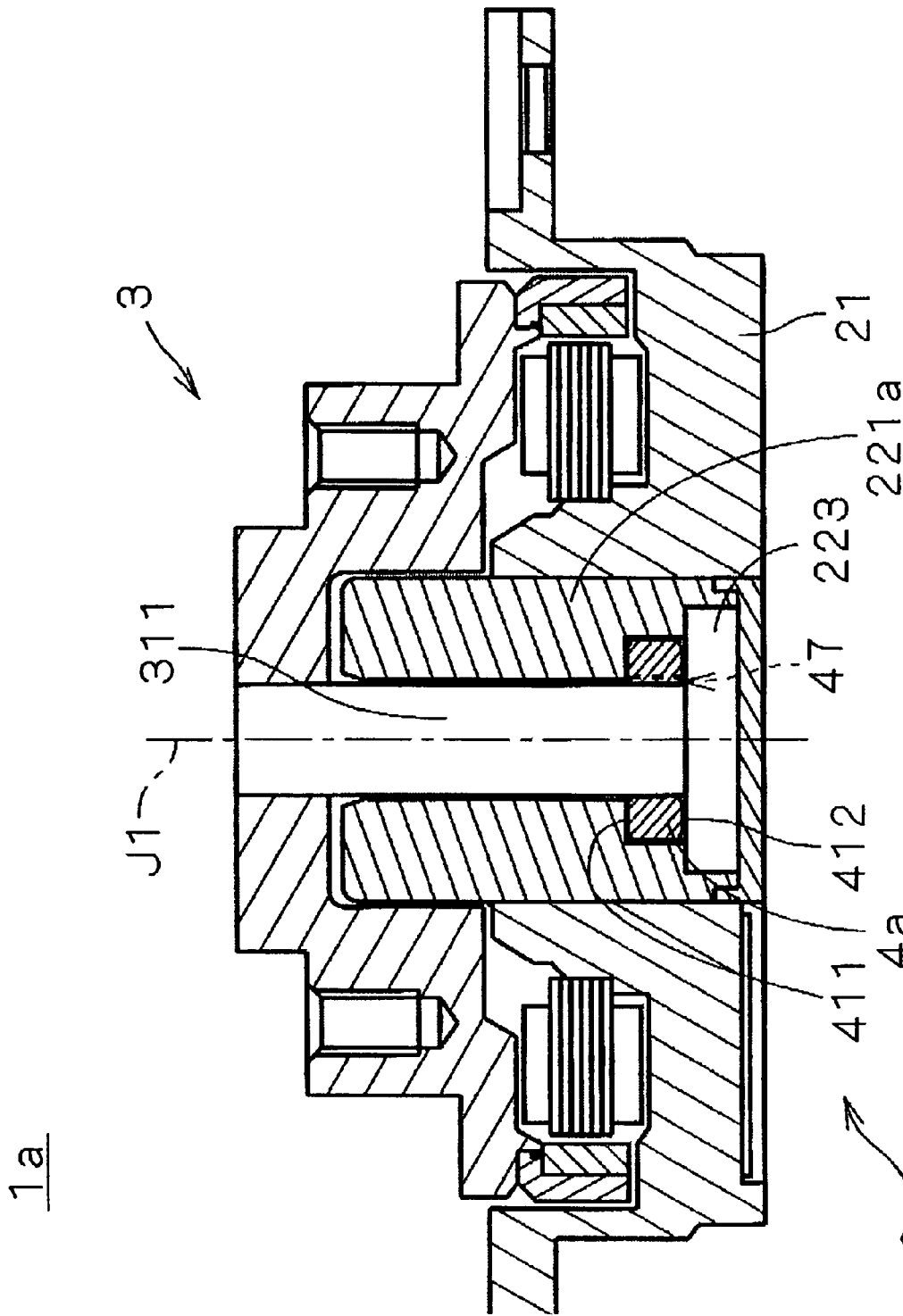
FIG. 12 is a cross sectional view illustrating a motor according to a second preferred embodiment of the present invention.

Next, a motor according to a second preferred embodiment of the present invention will be described. FIG. 12 is a cross sectional view illustrating a motor 1a according to the second preferred embodiment of the present invention. In the motor 1a, the configuration of the fluid dynamic bearing mechanism of the motor 1a is different from that of the motor 1 illustrated in FIG. 2. The rest of the configurations of the motor 1a are the same as those illustrated in FIG. 2 and are labeled with the same reference marks in the description that follows.

In the fluid dynamic bearing mechanism of the motor 1a illustrated in FIG. 12, a sleeve 221a has a form defined by the sleeve 221 and the sleeve housing 222 according to the first preferred embodiment of the present invention. The sleeve 221a is made of the stainless steel material, for example, and is fitted in the opening arranged in the base portion 21. A radially inner surface of the sleeve 221a radially faces the outer side surface of the shaft 311 such that the taper-seal section preventing the lubricating oil from leaking outside the bearing mechanism is defined therebetween. A substantially discoid thrust plate 4a is arranged at the axially lower end portion of the shaft 311. When the force removing the shaft 311 from the sleeve 221a, the thrust plate 4a engages with a lower surface of the sleeve 221a, preventing the shaft 311 from being removed. The lower surface of the sleeve 221a axially facing the upper annular surface 411 of the thrust plate 4a includes thrust dynamic bearing grooves. The axially upper surface of the sealing cap 223 axially facing the lower annular surface 412 of the thrust plate 4a also includes thrust dynamic bearing grooves.

Figure 13:
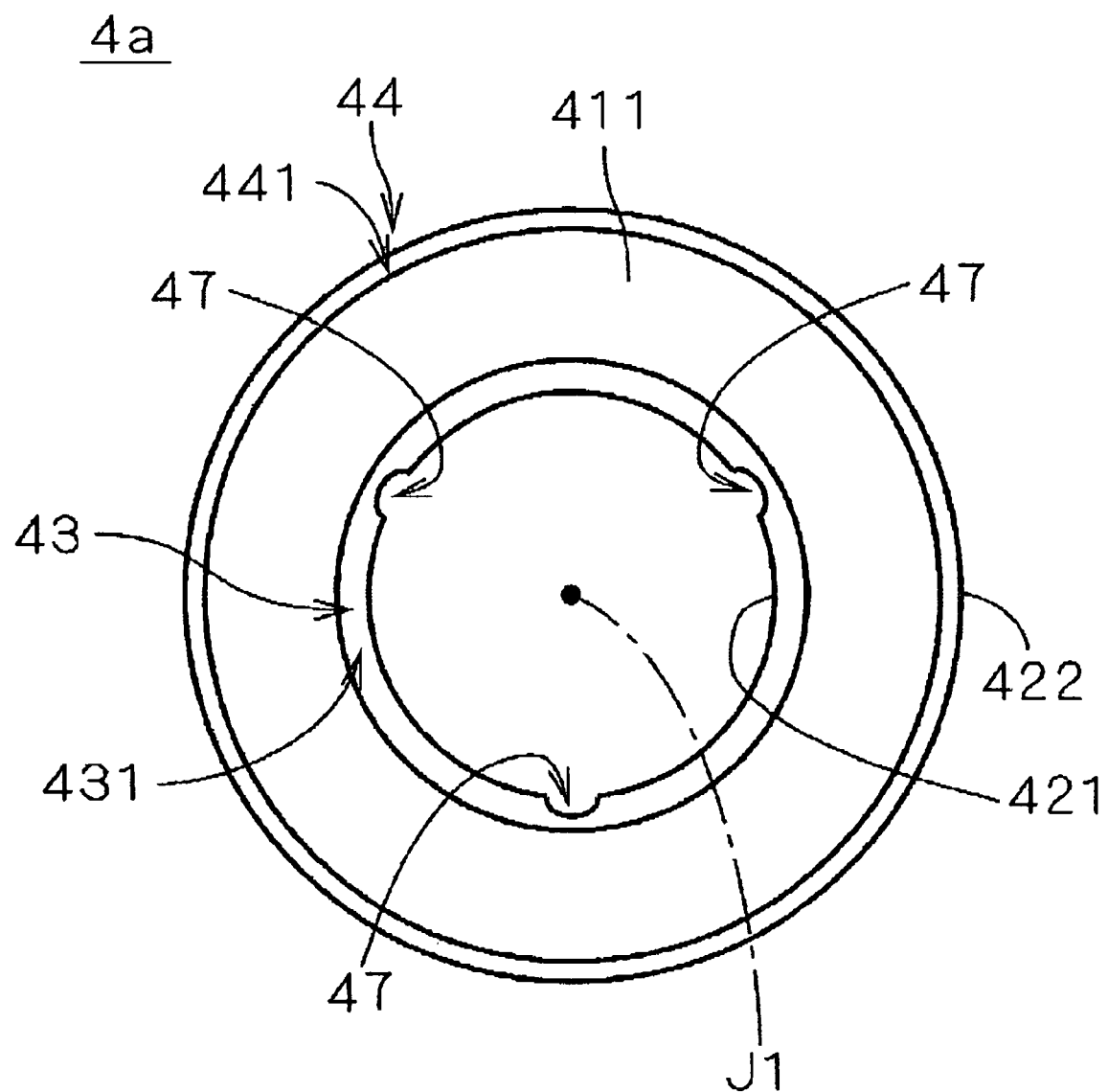
FIG. 13 is a plan view illustrating a thrust plate according to the second preferred embodiments of the present invention.

FIG. 13 is a plan view illustrating the thrust plate 4a. As illustrated in FIG. 13, a communicating groove 47 is provided in the inner circular surface 421 of the thrust plate 4a (see FIG. 12). The communicating groove 47 axially extends in the inner circular surface 421 between the axially upper side and the axially lower side of the thrust plate 4a, and thus the dynamic pressures generated at the axially upper portion and the axially lower portion of the thrust plate 4a are adjusted approximately equal each other. In other words, the communicating groove 47 is provided to even out the dynamic pressures of the axially upper side and the axially lower side of the thrust plate 4a.

Figure 7:
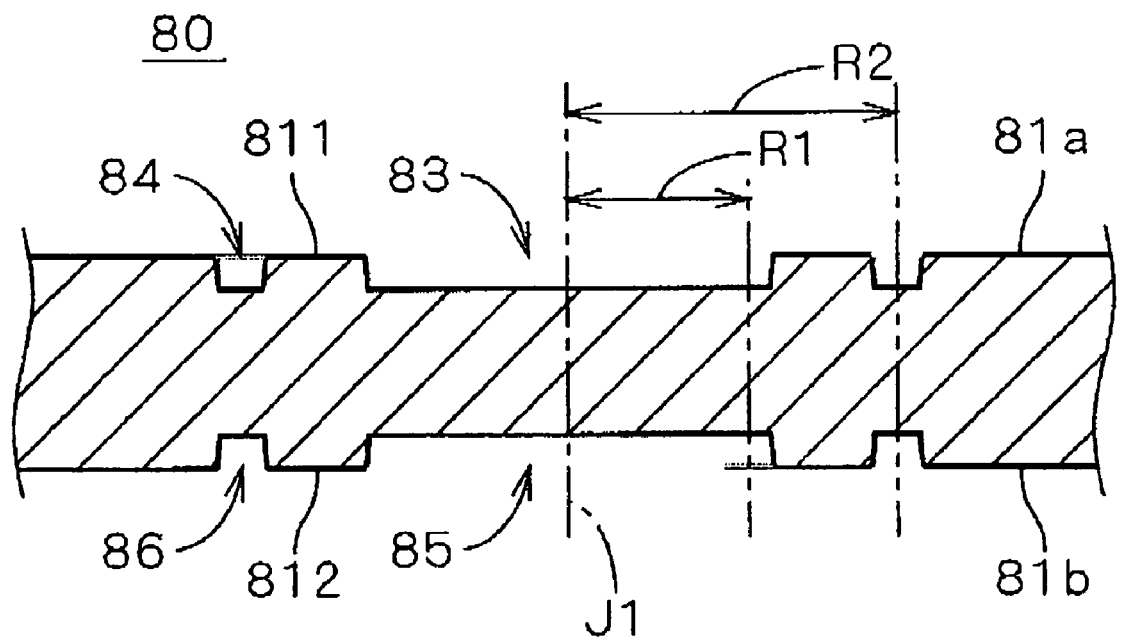
FIG. 7 is a view illustrating one process of manufacturing of the thrust plate.

Next, a method of manufacturing the thrust plate 4a illustrated in FIG. 13 will be described below. Firstly, the upper and lower middle concave portions 83 and 85, and the upper and lower annular concave portions 84 and 86 (see FIG. 7) are formed in the upper and lower surfaces of the work piece 80 by the press working. Then, the middle portion of the work piece 80 is punched, by applying force axially downwardly directed to a radially inside of the middle portion of the work piece from the axially upper side thereof, with a die having a circular shape centered on the center axis J1. The die has a convex portion corresponding to the communicating groove 47, and thus, the inner circumferential surface 421 and the communicating groove 47 are formed in the work piece 80 concurrently. After cutting the annular member 8 away from the work piece 80, the deburring work and washing process may be performed, and manufacturing of the thrust plate 4 will be finished. Through the configuration just described above, in which the inner circumferential surface 421 and the communicating groove 47 are formed at once, the thrust plate 4a illustrated in FIG. 13 is manufactured efficiently. In the present preferred embodiment of the present invention as well, when the adhesive is applied to the shaft 311 to adhere the shaft 311 and the thrust plate 4a, the shaft 311 and the thrust plate 4a may be configured that a part of the adhesive removed in fitting the shaft 311 into the thrust plate 4a remains within the upper and/or lower inner indented portions such that the removed adhesive does not axially protrude from the axially end surface(s) of the thrust plate 4a.

While embodiments of the present invention have been described in the foregoing, the present invention is not limited to the embodiments detailed above, in that various modifications are possible.

For example, it is not necessary to provide all of the lower inner indented portion 451, the upper inner indented portion 431, the lower outer indented portion 461, and the upper outer indented portion 441. Only some of them may be formed in the thrust plate to accommodate the burr (i.e., the protruding portion) therein such that it does not adversely affect the bearing mechanism.

In the method of manufacturing the thrust plate according to the preferred embodiments of the present invention, the upper and/or the lower middle concave portion having a circular shape is arranged in the work piece 80. However, the upper and/or the lower middle concave portion may have an annular shape centered on the center axis J1.

The thrust plate according to the preferred embodiments of the present invention may be a retaining member which prevents the shaft from being removed from the sleeve without defining a part of the thrust dynamic bearing mechanism.

A motor involving the preferred embodiments of the present invention does not necessarily have to be the inner-rotor type, in which the rotor magnet is disposed to the center-axis J1 side of the armature, but may be an outer-rotor type, in which the rotor magnet is disposed to the outside of the armature. In this case, the magnet is attached to a radially outside surface of the rotor hub.

Still another possible modification is that so-called gas-pressure bearings, in which gas serves as the working fluid, may be used as the bearing mechanism.

The motor according to the preferred embodiments of the present invention may be used for an optical disk drive device, a magnetic optical disk drive device and the like.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A method of manufacturing a thrust plate having an annular shape and fixed to a shaft of a fluid dynamic bearing mechanism, the method comprising steps of:
   a) preparing a work piece having a plate-like shape with one axial surface and other axial surface substantially parallel to each other;
   b) forming a middle concave portion having a circular outer rim centered on a center axis substantially perpendicular to the one and the other axial surfaces of the work piece;
   c) forming an annular concave portion having an annular shape with a radially outer rim and a radially inner rim centered on the center axis in the other axial surface of the work piece and arranged radially outside of the middle concave portion;
   d) cutting a portion radially inside of the circular outer rim of the middle concave portion away from the work piece along the circular outer rim by press working, in which force directed from the one axial surface to the other axial surface is applied to the portion radially inside of the circular outer rim, to form an inner circumferential surface of the thrust plate; and
   e) cutting the work piece at a portion radially between the radially outer rim and the radially inner rim of the annular concave portion by press working, in which force directed in the axial direction from the one axial surface to the other axial surface is applied to radially inside from the portion between the radially outer rim of and the radially inner rim of the annular concave portion, to form an outer circumferential surface of the thrust plate.

2. The method as set forth in claim 1, wherein an adhesive used to fix the thrust plate to the shaft is arranged in an indented portion, where the part of the one surface is axially inwardly indented, formed in the step d), and defined by a part of the middle concave portion.

3. The method as set forth in claim 1, wherein a communicating groove adjusting dynamic pressure in the fluid dynamic bearing mechanism is formed, in the step d), in the inner circumferential surface of the thrust plate.

4. The method as set forth in claim 1, further comprising a step of deburring applied to a portion where the work piece is cut in the steps d) and e).

5. A method of manufacturing a thrust plate having an annular shape and fixed to a shaft of a fluid dynamic bearing mechanism, the method comprising steps of:
   a) preparing a work piece having a plate-like shape with one axial surface and other axial surface substantially parallel to each other;
   b) forming a middle concave portion having a circular outer rim centered on a center axis substantially perpendicular to the one and the other axial surfaces of the work piece;
   c) forming an annular concave portion having an annular shape with a radially outer rim and a radially inner rim centered on the center axis in the one axial surface of the work piece and arranged radially outside of the middle concave portion;
   d) cutting a portion radially inside of the circular outer rim of the middle concave portion away from the work piece along the circular outer rim by press working, in which force directed from the other axial surface to the one axial surface is applied to the portion radially inside of the circular outer rim, to form an inner circumferential surface of the thrust plate; and e) cutting the work piece at a portion radially between the radially outer rim and the radially inner rim of the annular concave portion by press working in which force directed from the one axial surface to the other axial surface is applied to radially inside from the portion between the radially outer rim of and the radially inner rim of the annular concave portion, to form an outer circumferential surface of the thrust plate.

6. The method as set forth in claim 5, wherein steps d) and e) are performed concurrently.

7. The method as set forth in claim 5, wherein an adhesive used to fix the thrust plate to the shaft is arranged in an indented portion, where the part of the one surface is axially inwardly indented, formed in the step d) and defined by a part of the middle concave portion.

8. The method as set forth in claim 5, wherein a communicating groove adjusting dynamic pressure in the fluid dynamic bearing mechanism is formed, in the step d), in the inner circumferential surface of the thrust plate.

9. The method as set forth in claim 5, further comprising a step of deburring applied to a portion where the work piece is cut in the steps d) and e).

* * * * *